Jan. 13, 1970     W. SCHANBACHER     3,488,888
SPIRAL DRILL GRINDING MACHINE
Filed Aug. 4, 1967     7 Sheets-Sheet 1

Fig. 1

Inventor:
WILLI SCHANBACHER
by
Stephen H. Frishauf, Atty

United States Patent Office 3,488,888
Patented Jan. 13, 1970

3,488,888
SPIRAL DRILL GRINDING MACHINE
Willi Schanbacher, Marlinstrasse 25,
Esslingen (Neckar), Germany
Filed Aug. 4, 1967, Ser. No. 658,441
Claims priority, application Germany, Aug. 5, 1966,
Sch 39,361
Int. Cl. B24b 7/00, 9/00
U.S. Cl. 51—55      19 Claims

ABSTRACT OF THE DISCLOSURE

A motor-grinding disc combination is mounted for swinging and translatory movement, under control of a template or pattern, with respect to a clamped drill; swinging is about a fixed (in space) axis (5) and an axis (1) about a plane transverse to the fixed axis, the translatory movement being derived from the combined swinging movement, as controlled by the template, and guided by a pattern curve.

---

This invention relates to a spiral or twist drill grinding machine and more particularly to a machine in which a twist drill and a grinding disc are relatively moved in a two-way horizontal swing movement. During the grinding process a non-rotatably clamped drill and the grinding disc are moved relatively about a plurality of axes and the extent of movement is controlled by a fixed template or pattern.

The grinding of the tips of spiral drills is not a very simple operation because of the complex geometrical relationships in the region of the drill tip. Machines used to sharpen twist drills have a relatively complicated construction and are normally too expensive for small businesses and workshops. The known drill grinding machines work according to various principles, of which one example is embodied in German Patent 739,722—the so-called cone shaped shell process. The drill clamp in this case is rotatable around an axis which forms a definite generator angle with the grinding disc. The basic intention is to provide the cutting lips of the drill from the drill periphery right down to the tip with an increasing back slope, or back rake, which increases for example from approximately 5° at the periphery to around 18° at the drill tip, i.e., more exactly at the drill core. The generation of this constantly rising back slope is difficult and is often obtained simply as an approximate solution which is suitable for drills of a small diameter. These relationships are given in detail in German Patent 454,787.

Apart from the so-called cone shaped shell process there is also known the method of grinding the drills with a so-called helicoidal cut, a four-faced cut or a so-called two stage cut, whereby, by means of the last named, is supposed to be obtained the result that the transverse edge running across the drill core receives a more positive rake angle.

Alongside the above mentioned drill grinding machines operating preferably in accordance with the cone shaped shell process on which the non-rotatable clamped drill is rotated during the grinding operation around a fixed swivel axis—which can, of course, be adjusted—there are also known drill grinding machines on which the drill is also driven towards the grinding disc during the grinding operation. On machines which operate with a non-rotatable drill, the drill, after grinding of one cutting edge, must be rotated round 180°, if necessary with its clamping arrangement, in order that the other cutting edge can be ground, whereas, on those machines which has a rotatable drill both cutting edges are automatically ground. On these machines with which a helicoidal cut can, for example, be obtained—cf. German Patent 1,-075,459—the drill must execute during the grinding operation an axial longitudinal movement which is superimposed on the swivel movement and which is necessary for forming the cross edge at an angle of 55°. The cross edge of the drill must in fact form an angle of this size with the cutting edges. The difficulties occasioned by this requirement which have a decided effect, along with the slope of the back rake angle, on the cutting qualities of the drill are detailed in German Patent 1,055,390. Generation of the axial movement of the rotating drill is usually effected by cam plates or the like, some examples of which are given in the above mentioned patent.

Although it is possible with grinding machines which operate with a rotating drill to obtain a very satisfactory cut, the constructional cost of such a machine is extraordinarily high because an additional drive for the drill must be provided and, in addition, as a result, the mounting provided for the drill must be very carefully arranged or otherwise it would not be possible to obtain symetrically ground cutting lips or else chatter marks or the like would be produced on the surfaces to be ground. These difficulties are further increased due to the fact that the mounting for the drill must permit not only the rotating movement for the drill but also the axial movement for it mentioned above. Machines of this type are therefore too dear to be used in smaller workshops for grinding blunt drills; in addition, their operation and maintenance demand a certain expert knowledge whilst the precision bearings used limit the machine life.

An object of the present invention is to create a spiral drill grinding machine which is suitable for use in small and medium size businesses in particular, and which is as a result characterised by a very simple and operationally safe construction in which complicated mechanisms and mountings can be omitted. At the same time, however, this machine should provide, along with simple and foolproof operation, absolutely perfect grinding ratios whereby adaptation to the grinding process prescribed or recommended by the drill manufacturer, be it the cone shaped shell process or the helicoidal cut or the four-face cut, must be possible. A need for such a machine has become even more apparent of late since the tungsten tipped drills being used in even greater quantities now can no longer be ground by hand, as was often the case with drills made from high speed steel.

The present invention is a spiral drill grinding machine including a non-rotatable clamped drill and a grinding disc in which the two-way horizontal swing movement, occurring during the grinding process, of the non-rotatable clamped drill and the grinding disc which is located by a swivel mounting having several axes of avertence by a fixed template, said swivel mounting including a first swivel axis which is spatial and a second swivel axis which is at right angles to said spatial axis, said axes intersecting at a point in the proximity of the grinding surface of the grinding disc, the drill axis passing through said point of intersection and said template controlled swivel movement providing a relative longitudinal movement between the drill tip and the grinding surface which serves to give the predetermined shape to the drill transverse edge and alters the distance between the drill tip and the grinding surface.

Constructionally this new concept can be realised in an advantageous manner in that the spatial avertence axis is formed from a pivot arranged on a frame base on which is rotatably mounted on one side a rigid curved piece at the other end of which is arranged the bearing for a second pivot pin forming the rotatable avertence axis and which carries the grinding disc or the drill clamping unit.

To produce the relative longitudinal movement between the drill tip and the grinding surface the arrangement can be such that the curved piece is coupled over a lever swing connection with a curved piece movably mounted on the unit connected to the second pivot pin. This piece controls the longitudinal movement of the unit axially displaceably mounted with reference to the bearing on the second pivot pin.

The new machine is characterised by a simple and operationally safe construction for which quite simple structural parts are used. The bearing areas may, since they need only be used for limited rotating motions, be constructed with the simplest means for stability and safe operation without any particular outlay being necessary. At the same time operation of the machine is absolutely without problem since the template will control the movement of the drill tip during the grinding process with reference to the grinding surface so that the template simply needs to be moved about. Because of corresponding formation of the curved surface of the template, i.e., of the path followed, as well as the interdependence of the relative longitudinal movement between the drill tip and the grinding surface, all desired grinding ratios can be produced on the drill tip without any trouble. Reclamping of the drill after producing one cutting lip in order to produce the other cutting lip is made unnecessary if the template is made of two separate templates of which each is arranged to one cutting lip and which can be moved one after the other.

The use of a movable template on a drill grinding unit is known in itself from German Patent 59,734. On the hand grinding apparatus described therein the drill is led into the transverse opening of a globe mounted for movement to all sides, whereby the template is arranged in the extension of its longitudinal axis and is moved about by means of a flat iron part with a handle and linked coaxially to the drill. This relatively simple device is, however, not of any use in dealing with tungsten tipped drills for example, since the precision obtainable with it is basically inadequate for the requirements arising with such drills. It is, therefore, not possible without very great expense to obtain play-free mounting for the globe carrying the drill unless the life of the device is to be uneconomically shortened; it must also be reckoned that the drill is simply led into the transverse opening in the globe which means that either a special, exact fitting guide sleeve for each drill diameter is ready made or else it must be accepted that because of the play present both cutting lips cannot be symetrically ground. A further complication is that spiral drills in the course of use are also subject to a certain wear in the original tolerance in the area of their periphery, as a result of which, it is simply not possible to obtain play-free guiding of the drill shaft by means of a tube with sliding fit. The hand grinding apparatus already known and going back to a very old concept has, therefore, never been introduced into practice.

Embodiments of the present invention will now be described, by way of example, with reference to the accompanying drawings in which.

Figure 1:
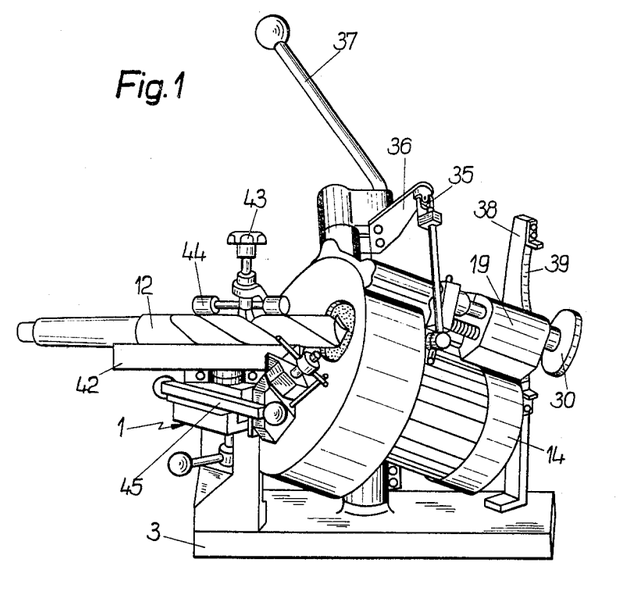
FIG. 1 shows a spiral drill grinding machine according to the present invention in perspective view, with a comprehensive view from the side.
Figure 2:
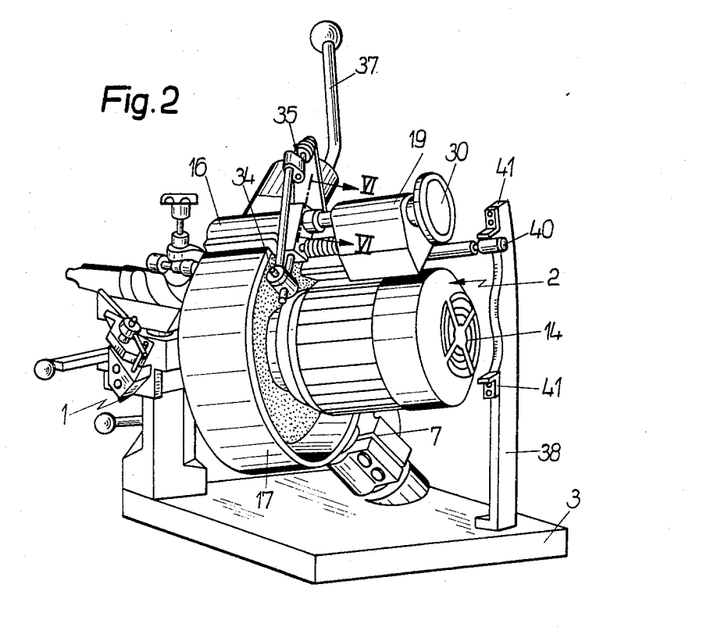
FIG. 2 shows the machine according to FIG. 1 in a general perspective view from behind.
Figures 3, 6:
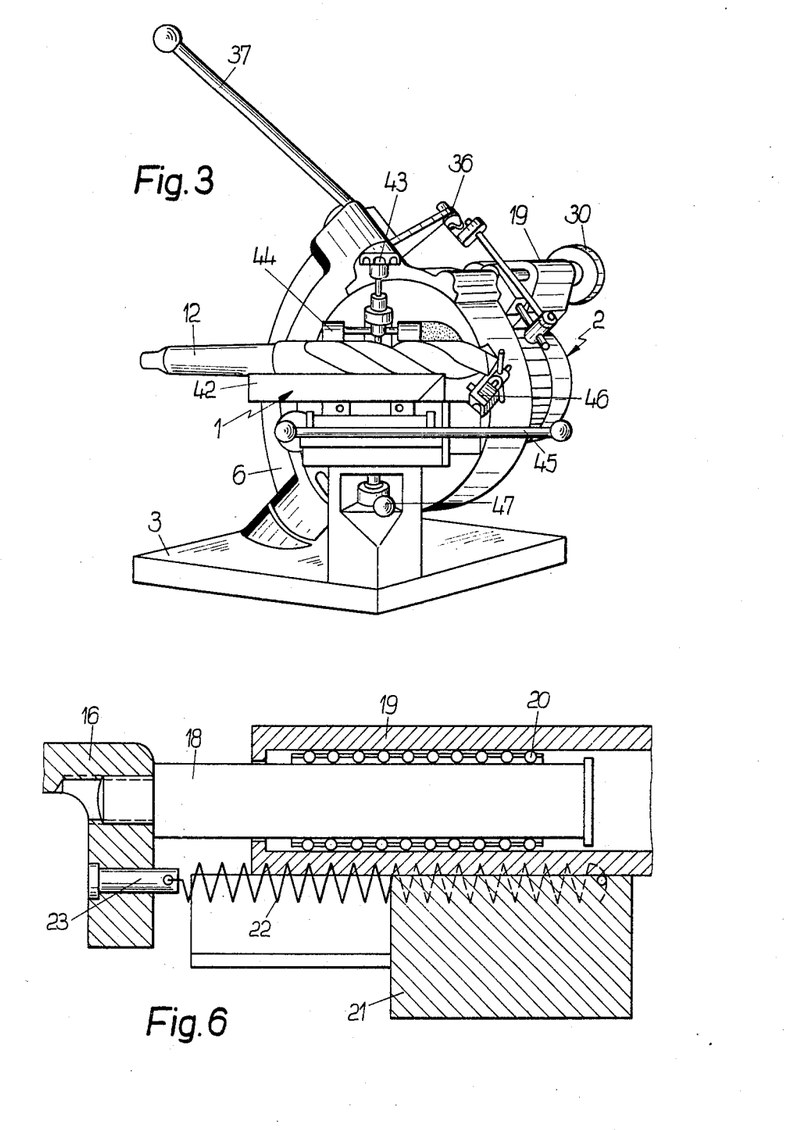
FIG. 3 shows the machine of FIG. 1 in a general perspective view angularly from the front with the drill swivelled aside.
FIG. 6 is a detail of the machine of FIG. 2 in longitudinal section along the line VI—VI of FIG. 2 in another scale and cutaway.

As can be seen from FIGS. 1 to 4 in particular a spiral drill grinding machine has a drill clamping unit 1 opposite which is movably mounted a drill grinding unit 2 (FIG. 2). On a base plate 3 there is fixedly mounted a pivot pin 4 (FIG. 4) through which runs a spatial avertence axis 5. On pivot pin 4 is rotatably mounted, by means of a roller bearing, a rigid curved piece 6 whose mounting 7 is enclosed. The curved piece 6 carries at its other end a second mounting 8 corresponding to mounting 7 and this also has a roller bearing and has mounted in it a second pivot pin 9 (FIG. 4), which defines a second avertence axis 10 which intersects at a point 11 at right angles to the spatial axis 5. Through point 11 also runs the axis 13 of a drill 12.

The second pivot pin 9 supports the grinding unit 2 which contains an electric motor 14 and a grinding disc 15. A bearing 16 is connected to pivot pin 9 and to this bearing 16 is fixed a protective hood 17 for grinding disc 15 and carries a projecting axle journal 18 (FIG. 6), which runs parallel to the axis of rotation of the grinding disc 15. A sleeve 19 is rotatably mounted on the axle journal 18 and is displaceable thereon by means of a spherical guide 20. Sleeve 19 is connected in turn by a piece 21 with the electric motor 14. In this way unit 2 is supported by axle journal 18. A tension spring 22 engages piece 21 and is anchored to bearing 16 at 23 and thereby strives to pull the unit 2 towards bearing 16.

Figure 4:
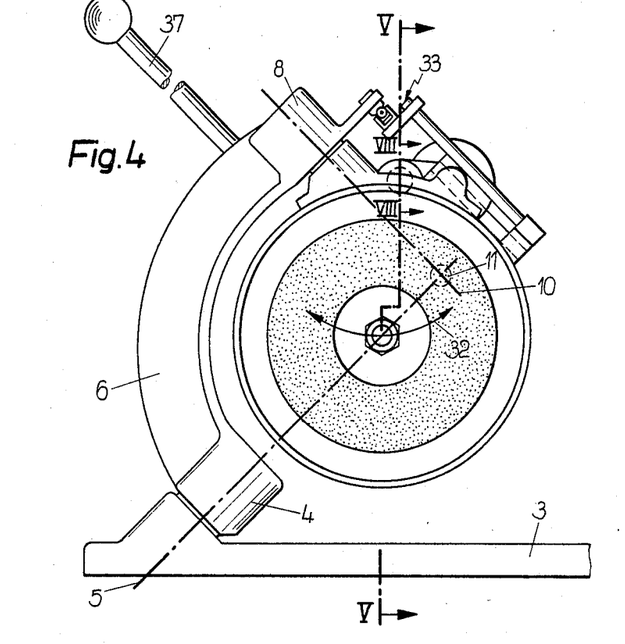
FIG. 4 shows the machine of FIG. 1 in a front view without the drill clamp.
Figure 5:
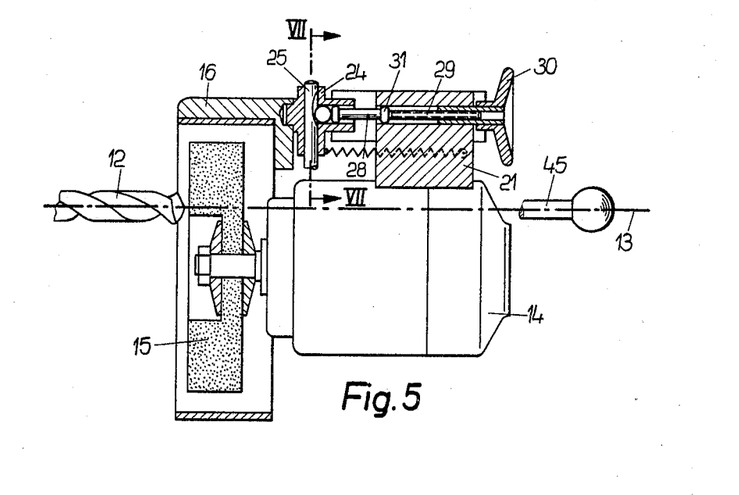
FIG. 5 shows the machine of FIG. 4 in longitudinal section along the line V—V of FIG. 4 with the omission of individual parts of the lever mechanism.
Figure 7:
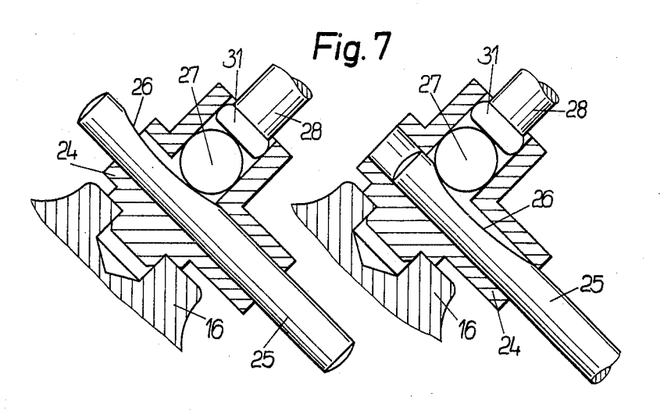
FIG. 7 is a detail of the machine of FIG. 5 cut along the line VII—VII of FIG. 5 to a different scale.
Figure 8:
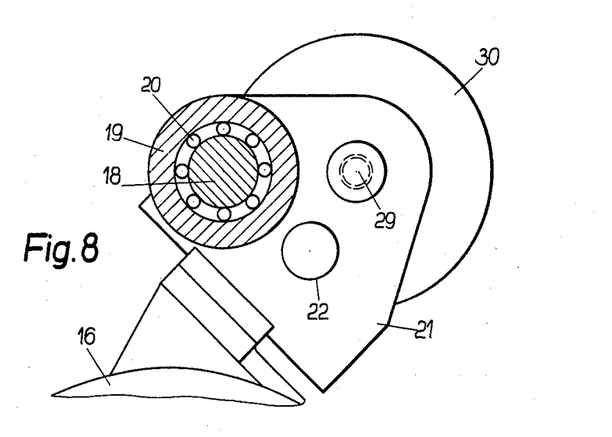
FIG. 8 shows the machine of FIG. 4 cut along the line VIII—VIII of FIG. 4 cutaway to reveal a detail of the mounting.

Bearing part 16 also mounts a sliding guide 24 in which a crank pusher 25 can be displaced, as shown in FIG. 7. The pusher 25 has a profile curve 26 on which is positioned a ball 27 housed in the guide 24 and against which impacts a pressure piece 28 which lies on the opposite side on a spindle 29 (FIG. 5) which is mounted for longitudinal adjustment by means of a handwheel 30 in part 21. Since the spring 22 directs unit 2 towards the bearing part 16, piece 21 is braced through spindle 29, pressure piece 28, ball 27 and crank pusher 25 against guide 24 and thus against bearing 16. If by this means the crank pusher 25 is displaced in its longitudinal direction, then part 21 and hence the unit 2, linked to it, and hence also grinding disc 15 move, with reference to bearing part 16, longitudinally in the direction of the axis of rotation of the grinding disc 15. The extent of movement is defined by the profile curve 26 of the crank pusher 25. The shaft of pressure piece 28 is thickened at 31, as can be seen in particular from FIGS. 5 and 7, and as a result it can be tilted to a certain degree in the bores of guide 24 and piece 21 which imparts to unit 2 a pendulum movement about the axle journal 18 as shown by the arrow 32 (FIG. 4).

Longitudinal movement of the crank pusher 25 is derived from horizontal swing movement of the curved piece 6 which is achieved by means of a lever mechanism 33 which comprises hinged bearings 34 and 35 coupled by an arm 36 which is rigidly connected to curved piece 6. This horizontal swing movement is produced by a handle 37 fixed to curved piece 6. By comparing FIGS. 1, 2 and 3, which illustrate various positions in space of the grinding unit 2, it may be seen that the distance between the end of the arm 36, and the lower hinged bearing 34 of the mechanism 33 varies with angular rotation of the individual parts of the lifting mechanism in relation to the crank guide 24 in the axial direction of the pusher 25— depending on the position of unit 2. As a result, horizontal movement of curved piece 6 by means of handle 34 displaces the pusher 25 longitudinally and in the course of this its profile curve 26 slides under ball 27 (see FIG. 7 left and right drawings). This produces axial displacement of unit 2 parallel to the axis of rotation of the grinding disc 15 which is super-imposed on the movement of curved piece 6, the size and amount of travel of disc 15 being determined by the form of the profile curve 26 of the pusher 25.

Horizontal swing movement which is caused by moving handle 37 is controlled by a template 38 which is fixed to the base plate 3 and has a profile curve 39 (FIG. 2) along which slides a rod 40 which is connected to the grinding unit 2. On the template are arranged two stops which limit the cam plate 39 at each end thereof. As a result of the choice of suspension of the grinding unit 2 on axle journal 18 at a position which is laterally offset with regard to the axis of rotation of the motor 14, the weight force of unit 2 which acts through the centre of gravity of the unit 2, strives to press the rod 40 against the cam plate 39. To this end it is sufficient to move the handle 37 up and down, whereby the forcing of rod 40 against the cam plate 39 follows automatically.

The spiral drill 12 which is clamped in place during the grinding operation is mounted in a prism-shaped recess 42 into which it can be pressed by means of a pressure piece 44 operated by a tension screw 43. The vertical height of recess 42 can be adjusted by means of a sliding key 45. The drill 12 clamped in recess 42 is rotatable about a vertical axis with the associated clamping devices 43, 44 as can be seen from the example in FIG. 3. This permits one to align the drill on clamping accurately by means of a permanently associated stop device 46 adjustable to the size of the drill and also to swing the aligned clamped drill into the operating position as exemplified in FIG. 1 or 2 in which its axis runs through point 11 and in which position it can be locked by a toggle 47.

The operation of a spiral drill grinding machine of the invention will now be described. Before grinding commences, the height of recess 42 is adjusted by means of sliding key 45 whereby the axis of drill 12 coincides with point 11. After clamping the drill 12, which is aligned by means of stop 46 and after moving it over into the operating position, handle 37 is moved up and down, while the grinding disc is running, so that rod 40 slides along the profile curve 39 of template 38. If necessary, during operation, the positioning of the grinding disc can be adjusted by turning the handwheel 30. The spatial shape of the ground cutting lip of drill 12 which results from the grinding process is specifically fixed by the joint operation of the swing movement provided by the profile curve 39 and axial movement of the grinding unit 2 which is controlled by the profile curve 26 of the crank pusher 25 and is dependent on the template. As a result, both the shape of the transverse edge and the rake of the back slope angle over the cutting lip from the drill periphery to the transverse edge are absolutely fixed. By changing the template 38 and the pusher 25 various back slope angles, tip angles and transverse edge shapes for the drill can be obtained, should these be required on the drill for special purposes. The changing of these two parts is very simple and can be effected by a minimum of manipulation.

Because of the special suspension of the grinding unit 2 on the axle journal 18 which imparts, as already mentioned, to the grinding disc 15 the pendulum movement shown by arrow 32 in FIG. 4, an extraordinarily good grinding profile of the cutting lip of the drill is achieved. At the same time, uniform wear of the grinding disc is ensured so that when transferring from the grinding of drills of small diameter to those of a large diameter the disc does not need to be removed beforehand. In addition, the grinding of the cutting lip is effected essentially vertical to the main edge on the lip, as a result of which the main edge has an outstanding cutting quality.

Figure 9:
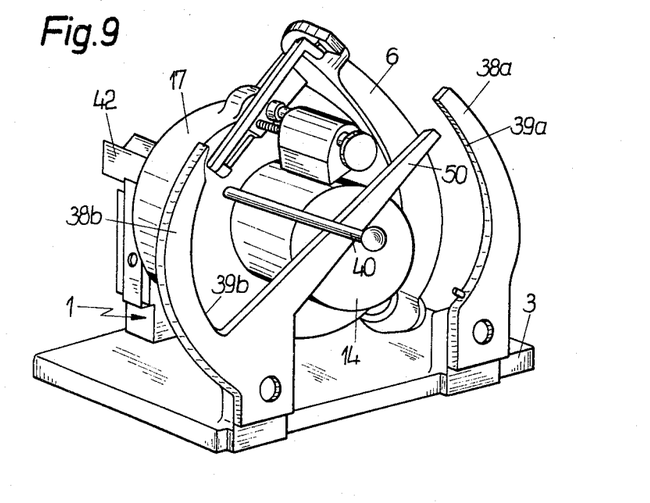
FIG. 9 is a machine according to another embodiment in a general perspective view from behind.
Figure 10:
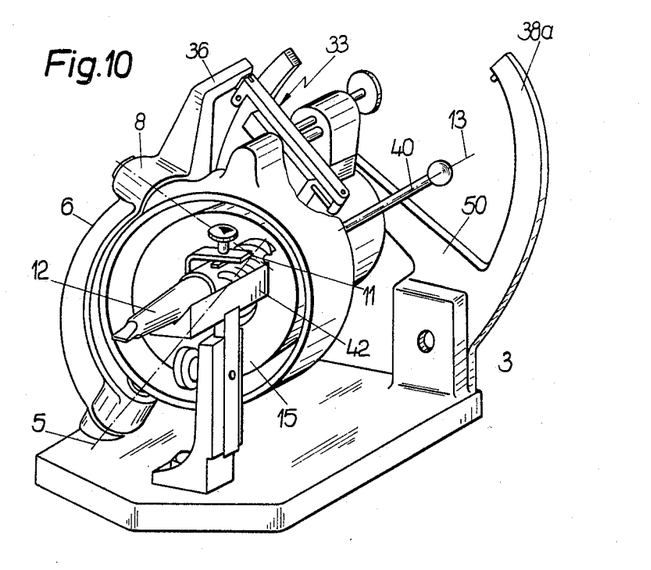
FIG. 10 shows the machine of FIG. 9 in a general perspective view from the front.
Figure 11:
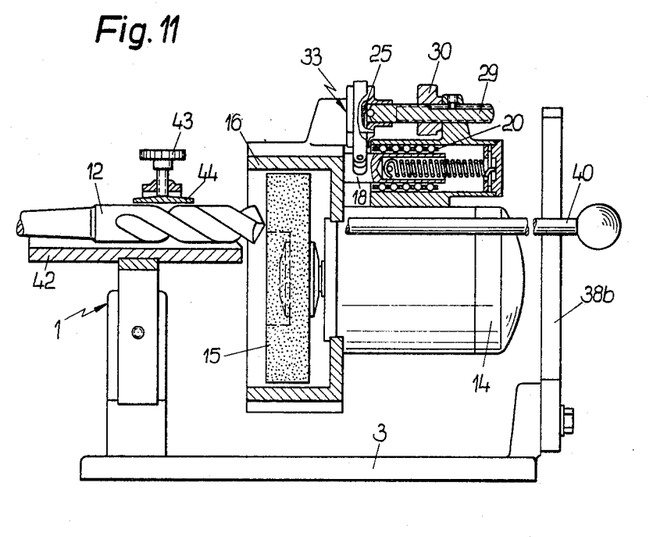
FIG. 11 shows the machine of FIG. 9 in axial section in a side view to another scale.

In the embodiment described above and as illustrated in FIGS. 1 to 8, there is only one template 38 on which rod 40 can be guided along, the end of said rod sliding on the profile curve 39 being aligned with the axis of the spiral drill 12, as shown in FIG. 5. However, it is also possible to provide two separate templates lying opposite each other (FIGS. 9, 10). In these figures the parts corresponding to the embodiment according to FIGS. 1–8 are represented by the same numbers. The two templates represented by 38a and 38b (FIGS. 8, 9) which have a somewhat different shape to their curved surfaces 39a, 39b permit both cutting lips of the spiral drill 12 clamped in the manner already described to be ground one after the other without there being any need to turn the drill round 180° in its recess 42 in between. In order to facilitate the passage of the rod 42 from curved surface 39b to curved surface 39a or vice versa, the template 38b is provided with an extending arm 50 (FIG. 9) which leads the rod 40 from one curved surface to the other. It would, of course, be possible to arrange the templates 38a, 38b in another position on the base plate 3 other than in the area behind the motor 14. On constructional grounds it can be particularly advantageous to fit the templates closer to the grinding unit 2, which is also true for the embodiment according to FIGS. 1–8 in which, as already stated, two templates can also be provided.

Whereas, on the described exemplified embodiments the grinding unit 2 is designed as displaceable and the spiral drill 12 remains stationary during the grinding operation, it would also be conceivable to arrange the motional relationships as complementary, i.e., to fit the motor 14 stationary with the grinding disc 15 and then to mount the drill clamping unit 1 displaceably in such a way as that described for the grinding unit 2.

Finally, it would also be possible to make the device in such a way that the grinding disc 15 makes contact with its peripheral surface and not its frontal surface, which might, on occasion, be of advantage. To do this the spatial details simply need to be turned round 90°.

The lever mechanism 33 is in the embodiments illustrated rigidly linked over arm 36 with the curved piece 6 in order that longitudinal movement of the crank pusher 25 may be derived from horizontal swing movement of the curved piece 6. It would be just as possible not to link the lever mechanism 33 with curved piece 6 but to anchor it on one side to the base plate 3 instead of to the arm 36. Movement of the unit 2, as is prescribed by the template 38, changes the distance between the crank pusher 25 and a point fixed to the base plate 3, and this change can be used through the lever mechanism 33 to displace the crank pusher 25. Naturally, profile curve 26 of the crank pusher 25 must be made to correspond to somewhat altered motional relationships.

Figure 12:
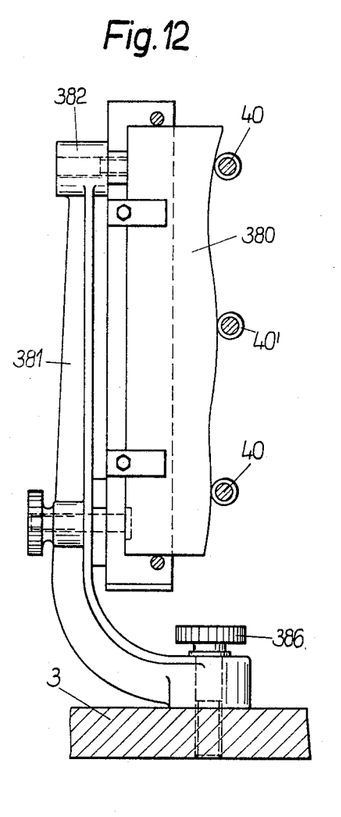
FIGS. 12 and 13 show the template of the machine in FIG. 1 in adjustable form in a front and side view to another scale.
Figure 13:
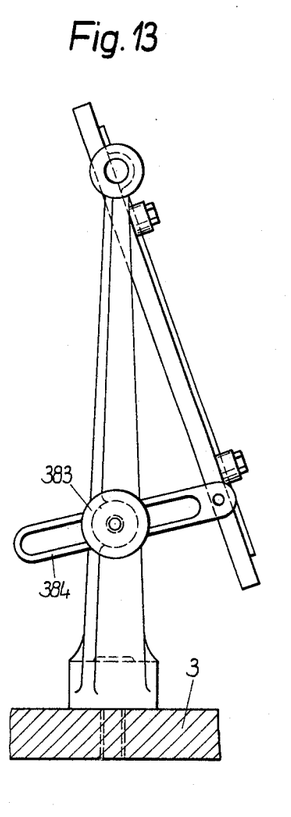

The template 38 or the two templates 38a, 38b are described above as fixed. In general, it would be possible to use such templates, arranged in stationary manner, if the differences in the diameters of the drills to be ground are not too great. If the drills to be ground vary largely in diameter then the shape of the template must be adjusted accordingly in order to obtain the desired shape of cutting lips. This can be easily effected by adjustably mounting the template or separate templates on the base plate 3 as shown in FIGS. 12 and 13. Referring to these figures, a template 380 is mounted on a holder 381 in which the swivel axis is represented by 382. Holder 381 is in addition secured rotatably to the base plate 3 by means of a screw 386. The swivel axis 382 runs at right angles to the rod 40 of the unit standing in the unswivelled starting position, corresponding, say, to position 40' (FIG. 12) and basically also to the position according to FIG. 5. It is also possible to arrange the swivel axis 382 skew to he rod 40 in this position so that by altering the tilt of template 380, this axis undergoes a change in position in the region of its guiding edge for rod 40. As a result, the widest possible range of differing core diameters of drills can be used. The skew arrangement can be obtained in the above instance by turning the whole holder around the screw 386 whose axis intersects the swivel axis 382. It would also be conceivable to make the swivel axis 382 correspondingly adjustable.

I claim:
1. Twist drill grinding machine comprising a base;
   a drill holding unit including clamp means clamping a drill;
   a motor unit connected to drive a grinding disc;
   means movably mounting said motor unit and said drill unit for relative movement therebetween;
   pattern means and feeling means engaging said pattern to control said relative movement;
   said mounting means being swingable about a fixed axis (5), fixed in space, and about a transverse axis (10) located in a plane at right angles to said fixed axis, said axes intersecting at a predetermined intersection point (11) in space, adjacent the grinding disc, said predetermined intersecting point further being aligned with the axis (13) of said twist drill;
   said mounting means further being movable for translatory relative movement between the face of said grinding disc and the tip of said drill, said translatory movement being controlled by the swinging movement under control of said pattern means.
2. Machine as claimed in claim 1 wherein said mounting means includes a pivot pin (4) located on the base (3) of the machine and forming said fixed axis (5);
   a yoke (6) swingably mounted on said pin at one end thereof;
   a stud (9) mounted on said yoke (6) on the other end thereof and forming said transverse axis (10); and
   means mounting one of said units (1) or (2) of said stud (9).
3. Machine as claimed in claim 2 wherein said pattern means includes a pattern carrier (FIGS. 5, 7, (25)) and a pattern sensing means (27, 31) engaging said pattern carrier;
   link means interconnecting the yoke (6) and said respective unit (1) or (2), mounted on said stud (9), said pattern sensing means controlling the translatory movement of said respective units with respect to each other upon swinging movement above said yoke (6).
4. Machine as claimed in claim 3 wherein said pattern carrier being a pattern rod (25) formed with a curved face (26); and said sensing means being a feeler resiliently engaging said curved face for axial movement.
5. Machine as claimed in claim 2 wherein said means mounting one of said units includes a stub shaft (18) extending at right angles to the transverse axis (10) and swingable about said stud (9); and means suspending said respective units (1) or (2) for swinging movement about said stub shaft (18).
6. Machine as claimed in claim 5 wherein said means suspending said respective unit from said stub shaft (18) includes axially, manually adjustable mounting means (29, 30) to adjust the axial position of said respective unit on said shaft.
7. Machine as claimed in claim 5 wherein said pattern means includes a template (38) and a sensing rod (40) having an axis intersecting said intersection point (11) said sensing rod (40) being secured to the respective unit (1 or 2) and engaging said template (38); and said respective unit being suspended for swinging movement about said stub shaft (18) at a point where the inherent weight of the unit will press said sensing rod against said template, by gravity.

8. Machine as claimed in claim 2, wherein said pattern means includes a sensing rod (40) secured to the respective unit (1 or 2) and extending parallel to the longitudinal axis of said unit and aligned with said predetermined intersection point (11); said rod (40) engaging said template (38).
9. Machine as claimed in claim 8, wherein said template includes a pair of pre-formed parts (38a, 38b), each part forming a cutting template for one cutting edge of said drill.
10. Machine as claimed in claim 9 including a cross-guide (50) arranged between said pre-formed parts (38a, 38b), and adapted for engagement by said rod (40) to guide cross-over from one template, for one cutting edge of the drill, to the other.
11. Machine as claimed in claim 2 including an operating rod (37) secured to the yoke (6) in the region of said stud (9).
12. Machine as claimed in claim 1 wherein said clamp means for said drill (12) includes a stop (46) to align said drill on said clamp means (42, 43, 44), said stop (46) being located away from the face of said grinding disc;
   said clamp means being movably mounted on said base plate to permit movement of said aligned drill towards the face of said grinding disc; and
   means locking said clamp drill to prevent unintentional movement thereof.
13. Machine as claimed in claim 12 wherein said stop (46) is fixably mounted on said base (3) and said clamp means includes a drill holding part (42), said holding part being swingably mounted on said base (3) about a vertical axis to swing from an alignment position to a grinding position.
14. Machine as claimed in claim 2 including a pattern carrier means (25) and a pattern sensing means (27, 31) engaging said pattern carrier; means interconnecting said respective unit (1 or 2) and one of said pattern means for translatory movement; and link means (33) secured to said base (3) and to one of said pattern means to control said translatory movement as a result of swinging movement of said respective unit in said yoke.
15. Machine as claimed in claim 8, said template (380) being mounted to be movable in its orientation with respect to said rod (40).
16. Machine as claimed in claim 15 including a movable holder (381) for said template (380), said holder being swingable about a swing axis (382) extending at right angles to said rod (40) when the respective unit (1 or 2) is in its rest position.
17. Machine as claimed in claim 15 including a movable holder (381) for said template (380), the movement of said holder being swingable about an axis (382) which is tilted with respect to said rod when the respective unit is in its rest position.
18. Machine as claimed in claim 17 wherein said holder (381) is pivotally mounted to pivot about a vertical axis (386).
19. Machine as claimed in claim 17 wherein said holder (381) is mounted for pivoting movement about a vertical axis (386) and in a plane intersecting said swing axis (382).

References Cited

UNITED STATES PATENTS

| 2,400,783 | 5/1946 | Roseberry | 51—55 X |
| 2,619,779 | 12/1952 | Kristenson | 51—55 |
| 3,022,609 | 2/1962 | Abadjieff | 51—55 |

FOREIGN PATENTS

| 739,722 | 10/1943 | Germany. |
| 1,063,484 | 8/1959 | Germany. |

JAMES L. JONES, Jr., Primary Examiner